Sept. 27, 1938. H. S. COLTON 2,131,312
MAKING ZINC COMPOUND FROM GALVANIZER'S WASTE
Filed July 23, 1936
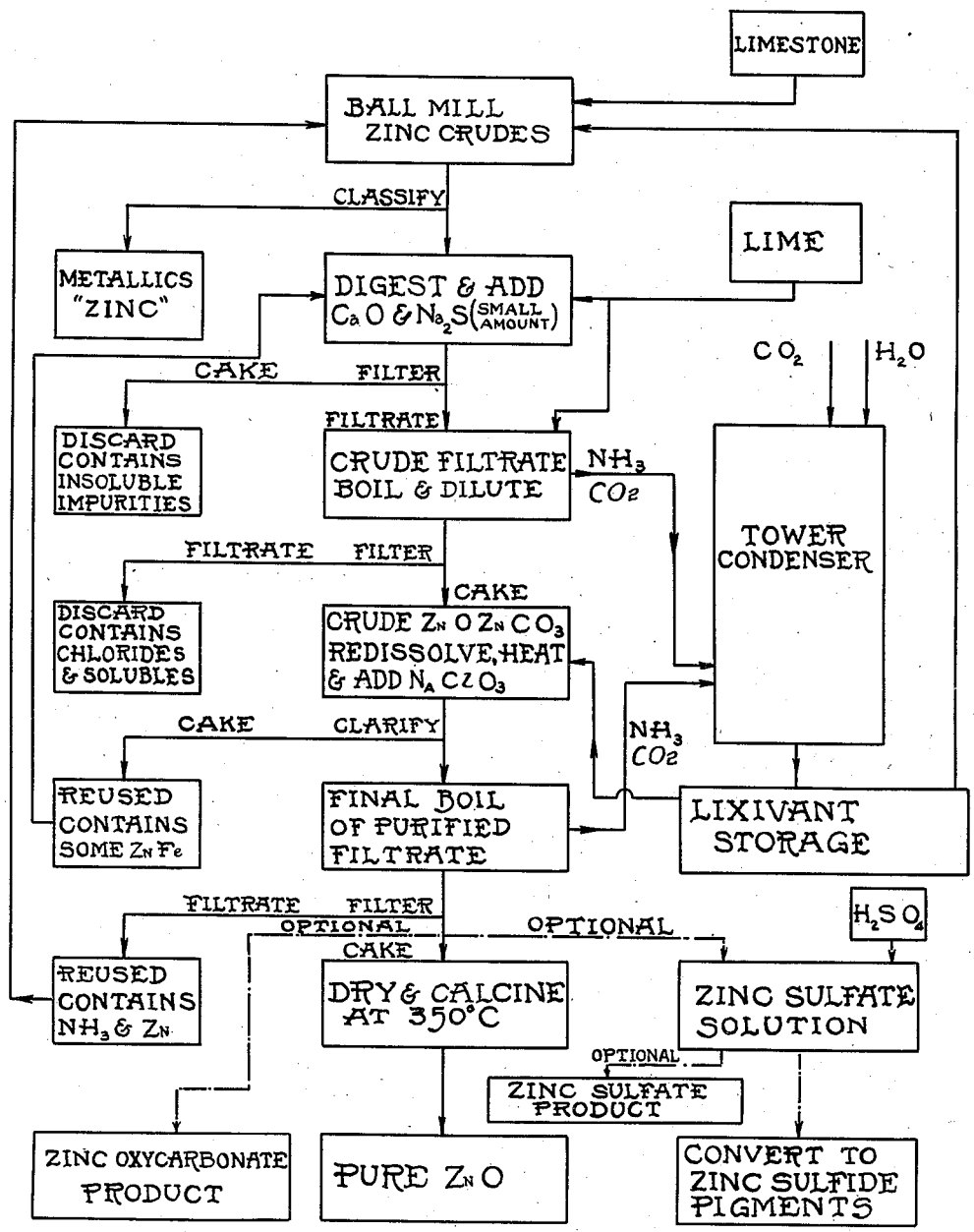

Patented Sept. 27, 1938

2,131,312

UNITED STATES PATENT OFFICE 2,131,312

MAKING ZINC COMPOUND FROM GALVANIZER'S WASTE

Henry Seymour Colton, Shaker Heights, Ohio

Application July 23, 1936, Serial No. 92,235

5 Claims. (Cl. 23—61)

This invention relates to making zinc compounds from galvanizer's waste; and it comprises a process for the recovery from sal skimmings, or from like zinciferous chloride-containing materials, of purified zinc compounds sufficiently free of chlorine to enable their use in producing high grade zinc sulfide pigments, said process comprising first extracting the skimmings with strongly ammoniacal ammonium carbonate solution with an addition of lime thereto and separation of non-zinciferous insoluble matter, then boiling the solution-extract with precipitation and separation of zinc oxy-carbonate and with substantially complete recovery of the ammonia and of excess $CO_2$, discarding the liquor containing calcium chloride and soluble impurities, then redissolving the separated zinc oxy-carbonate in ammoniacal ammonium carbonate solution with addition of an oxidizing agent and with further separation of insolubles and heating the solution to precipitate and separate a purified zinc oxy-carbonate sufficiently low in chlorine to use in making lithopone or other zinc sulfide pigments, finally returning the solution containing residue zinc to the first extracting operation for a succeeding batch of sal skimmings; all as more fully hereinafter set forth and as claimed.

In the galvanizing industry considerable quantities of waste material are produced from the sal ammoniac used as a flux upon the molten zinc to prevent access of air during the galvanizing action. These waste materials are known variously as galvanizer's waste, sal skimmings, dry skimmings, zinc ashes, etc. The skimmings contain, besides metallic zinc and zinc-iron dross, considerable quantities of zinc oxide and zinc chloride and ammonium chloride with various impurities such as alumina and iron oxide, silica, and varying amounts of metallic salts (Fe, Ni, Cu, Mn, etc.). The chloride content may run as high as 15 to 25 per cent Cl. The chief valuable component is of course zinc and its compounds.

Many attempts have been made to recover the zinc values in galvanizer's waste and some of them have been successful. The zinc compounds present are for the most part insoluble in water and it is a more or less simple matter to extract the zinc compounds with acids and to recover the salts. It is a simple matter also to distil off the ammonia with lime. Zinc oxide and zinc salts thus recovered are not however suitable for making zinc sulfide pigments because of the difficulty of obtaining zinc salts sufficiently free of chlorides. Because of the high chloride content, it has been impracticable to utilize galvanizer's waste as raw material for making lithopone, for example.

Lithopone consists of zinc sulfide and barium sulfate and is usually made by mixing zinc sulfate and barium sulfide in solution with a coprecipitation of ZnS and $BaSO_4$. After calcination, lithopone is an excellent white pigment of great covering power and the coprecipitation process by which it is made is simple and economical. But lithopone containing chlorides even in small amounts when spread as a pigment darkens in color under the influence of sunlight. This property of discoloration or graying of lithopone paints in the sunlight is a serious disadvantage in exterior paints, as well as in white interior paints.

Much research has been expended on the cause and prevention of color instability of lithopone pigments; and it has developed that the presence of more than 0.1 per cent of combined chlorine makes a lithopone unduly sensitive and a content less than 0.02 per cent is desirable for complete light-stability.

Naturally, the raw materials from which the lithopone is made must be correspondingly low in chlorine content in order that the lithopone made therefrom shall meet the required standard and this has precluded the use of sal skimmings as a source material. Prima facie, their richness in chlorine makes them inapplicable. In the present invention one of the main objects achieved is the production from galvanizer's waste of zinc compounds sufficiently low in chlorine content to be used as a raw material for making high grade lithopone.

Recovery of zinc compounds from galvanizer's sal skimmings and like material by extraction with acids or alkalies with subsequent precipitation of insoluble zinc compounds, such as zinc hydroxide, is attended with the difficulty that in both the extraction and the precipitation too much chlorine accompanies the zinc. Separation of the ammonia content from the zinc is simple but zinc and chlorine have an inherent tendency to remain in combination as zinc chloride in acid solutions and as basic chloride when the acid is neutralized.

I have found however that by a double precipitation of zinc oxy-carbonate from solution in ammoniacal ammonium carbonate I can produce material sufficiently free of chlorine to make it available for making high grade lithopone. I first extract the sal skimmings with a solution of ammonium carbonate and ammonia in the presence of lime. By subsequent heating with lime, boiling off ammonia, I precipitate zinc oxy-carbonate containing some chloride or oxychloride. By filtering off the zinc oxy-carbonate precipitate, redissolving in ammoniacal ammonium carbonate solution and again precipitating zinc oxy-carbonate by heating the solution, a substantially complete separation of the chlorine from the zinc can be effected.

In the process the first digestion or extraction of the skimmings in ammoniacal ammonium carbonate solution with addition of lime effects a substantially complete solution of the zinc content of the skimmings. Filtration separates the insoluble impurities, such as silica and alumina and compounds of Fe, Ni, Cu, Mn, together with excess lime. The subsequent boiling of the filtrate with precipitation of zinc oxy-carbonate and recovery of the ammonia leaves the greater part or nearly all of the soluble chlorides in a solution which may be discarded. The precipitated zinc oxy-carbonate carries only a small chloride content and this is reduced by a re-solution in ammoniacal carbonate followed by reprecipitation of zinc oxy-carbonate. In the re-solution of the crude zinc oxy-carbonate still containing small amounts of chloride, it is advantageous to add a small amount of an oxidizing agent, such as sodium chlorate or alkali permanganate or chromate to insure the oxidation of any ferrous iron present to the ferric condition. This insures a substantially complete separation of iron as insoluble ferric hydroxid. In the final heating of the purified filtrate derived from the second extraction by ammoniacal ammonium carbonate, it is unnecessary to effect a wholly complete precipitation of the zinc oxy-carbonate, as it is economically advantageous to return the liquor remaining after the second precipitation to the first step of the process for reuse in extraction of further quantities of sal skimmings. The zinc content and the ammonia content of the returned or recycled solution are recovered without substantial loss. Any impurities in this solution join the insoluble residue remaining after the first extraction of sal skimmings or the discarded liquor obtained as a filtrate after the first precipitation of zinc oxy-carbonate, as the case may be. The insoluble impurities are separated in the first extraction and the soluble impurities, particularly the soluble chlorides, are discarded in the filtrate liquor after the first precipitation. Usually there is an insoluble residue remaining from the re-solution of the first oxy-carbonate precipitate. This residue is separated from the solution by settling or filtration and is also returned to the slurry of sal skimmings in a succeeding extraction. This residue contains some zinc which is recovered and usually some iron which joins the insoluble matter separated in the sal skimmings extraction.

The lixiviant solution of ammonium carbonate and ammonia solution can be made up with a ratio of ammonia and $CO_2$ giving a maximum dissolving capacity for zinc oxide as described in the Rigg Patent 654,804 of 1900. This ratio is of the order of 2.8 mols $NH_3$ for each mol. of $CO_2$ giving a solution of ammonium carbonate with a surplus of about 0.8 mol. $NH_4OH$ for each mol. $(NH_4)_2CO_3$. A suitable concentration of ammonia in the lixiviant solution may be from 140 to 170 grams $NH_3$ per liter with 128 to 156 grams $CO_2$ per liter and the solution may have a dissolving capacity for zinc oxide up to 300 grams per liter or 2.4 pounds ZnO per gallon of solution. The precipitation of zinc oxy-carbonate removes $CO_2$ from the ammoniacal ammonium carbonate lixiviant and in the recovery of the ammonia boiled off in the precipitation of zinc oxy-carbonate, the $CO_2$ is replaced in the ammonia condensing tower from a convenient source such as flue gases. Any loss of ammonia in the process is more than compensated by the ammonia recovered from the sal skimmings.

As stated, the second precipitation of zinc oxy-carbonate gives a product substantially free of combined chlorine, with the result, when this purified product is used as a raw material in making lithopone, that the lithopone contains not more than 0.1 per cent and usually less than 0.02 per cent chlorine and is high grade in light-stability.

For making lithopone the oxy-carbonate of zinc dissolves readily in sulfuric acid as zinc sulfate solution, and by addition of barium sulfide to this solution lithopone is formed by the co-precipitation of barium sulfate and zinc sulfide; the precipitate being converted by calcination in the well known way to lithopone pigment. The zinc oxy-carbonate is readily converted to zinc oxide by calcination at a temperature around 350° C. and this calcined zinc oxide is of great purity. The process makes possible a production from galvanizer's waste of zinc oxide substantially free of chlorine.

In the accompanying drawing I have shown a diagrammatical flow sheet of the process as carried on in treating a typical galvanizer's waste analyzing as follows:

| | Per cent |
|---|---|
| Metallic zinc | 8 |
| Zinc oxide | 40 |
| Zinc chloride | 35 |
| Ammonium chloride | 5 |
| Aluminum and iron oxides | 5 |
| Insoluble matter, silica, etc | 5 |

This material is obtained in hard lumps which gradually "weather" and disintegrate under the influence of moisture. This galvanizer's waste is treated with a solution of ammonia and carbon dioxide, in approximately the ratio of 100 pounds of skimmings to 25 gallons liquid. A satisfactory solution for this purpose is one containing about 30 per cent or 300 grams per liter of ammonium carbonate with about 4 per cent or 43 grams per liter of free ammonia. In the solution about 71 per cent of the ammonia is combined with carbonic acid as ammonium carbonate and about 29 per cent of the ammonia is free ammonium hydroxide. The mixture of the solution with the galvanizer's waste is made in a ball mill or agitator tank and to the mixture certain residues received from subsequent treatments are added and also a small amount of ground limestone or calcium carbonate. The calcium carbonate is added to aid filtration of the ammonia-insoluble material which may be semi-gelatinous. The calcium carbonate also reacts slowly with the ammonium chloride to form ammonium carbonate and calcium chloride, the latter being later on removed as a soluble impurity. The ammonium carbonate serves as part of the lixiviant for dissolving zinc compounds. Five pounds of limestone per 100 pounds of waste may be sufficient. From the ball mill the mixture is passed through a "Dorr classifier" or other similar means for removing the metallic zinc. The remaining slurry-solution is pumped to a digester or storage tank in which it is held for the next operation which is filtration.

The filtration is accomplished by usual means and the cake is washed to remove residual zinc solution.

In the digester a small amount of lime hydrate is added and a small amount of sodium or ammonium sulfide. Lime aids in freeing ammonia from the zinc waste for the lixiviation and the sulfide facilitates precipitation of the heavy metals as sulfides and hydroxides.

The filter cake contains most of the insoluble impurities and excess lime.

The clear solution or crude filtrate including the washings is now heated by suitable means such as live steam and at temperatures above 60° C. the ammonia and residual carbon dioxide come off rapidly. These gases are led into a condensing tower where they are dissolved in water with addition of carbon dioxide from a convenient source such as flue gases or the subsequent calcination of zinc oxy-carbonate to oxide, or acid treatment of the oxy-carbonate to form zinc sulfate, thus making fresh lixiviant, the ammoniacal ammonium carbonate solution. After a small disengagement of ammonia, iron oxide begins to precipitate. This can be separately removed by filtration but it is usually more advantageous to leave the precipitated iron with the zinc oxy-carbonate to be removed in the succeeding re-solution of the latter. Some zinc always precipitates with the iron and the precipitate is returned to the extraction digester where the zinc is recovered and the iron joins the insoluble residue discarded after the extraction of the galvanizer's waste.

It is found advantageous as a general rule to add about 20 pounds of chemical lime to the crude filtrate being boiled. This completes the decomposition of ammonium chloride and aids in minimizing precipitation of oxy-chlorides with the zinc oxy-carbonate.

After the ammonia and carbon dioxide in the solution have been driven off completely, which is indicated by the rise of the boiling temperature to above 100° C. and by the temperature remaining stationary, the coarse granular precipitate or slurry of zinc oxy-carbonate, iron hydroxide and excess lime is diluted with water, and washed. The filter cake, no matter how carefully it is washed, always contains a small amount of combined chlorine. It is redissolved in fresh ammonium carbonate lixiviant of the same composition as that used in the first extraction of zinc waste. In this re-solution an addition of about 5 ounces of sodium chlorate or an equivalent amount of any suitable oxidizing agent is added to insure that all the iron is converted to the ferric form. Formation of chloride from the chlorate is usually immaterial or insignificant. The zinc oxy-carbonate is dissolved and the iron and most of the excess lime remain behind and are filtered off and returned to the digester or slurry storage tank, the ferric hydroxide joining the insoluble impurities removed in subsequent filtration. Any zinc compounds remaining with the precipitated iron are dissolved in the digester and thus recovered.

The clear solution or purified filtrate is now heated to distil ammonia and substantially pure zinc oxy-carbonate is precipitated, usually of the composition, $ZnO.ZnCO_3$. In this second distillation of ammonia only 80 to 90 per cent of the zinc oxy-carbonate is precipitated and the remainder is left in solution. To precipitate all of the zinc in solution requires large amounts of steam and a substantially complete boiling off of ammonia. It has been found economical to leave the removal of ammonia and the precipitation of zinc oxy-carbonate incomplete, and after filtration to return the filtrate to the first extraction step after it has been cooled and adjusted in ammonia and $CO_2$ content. The filtrate contains considerable quantities of ammonia and dissolved zinc.

The precipitated pure zinc oxy-carbonate is a useful material for many purposes. It may be marketed as such or the zinc oxy-carbonate precipitate may be dried and calcined for production of chlorine-free ZnO or it may be dissolved in sulfuric acid to form a zinc sulfate solution with disengagement of $CO_2$ which is recovered. The zinc sulfate solution so formed is substantially free of chlorine and forms an excellent raw material for manufacture of lithopone or other zinc sulfide pigments.

What I claim is:

1. In the recovery from zinciferous chloride-containing waste material of zinc oxide or other zinc compounds for use in making zinc sulfide pigments, a process of producing purified zinc compounds low in chlorine content which comprises extracting the waste material with a solution of ammonium carbonate and ammonia and with addition of lime, separating insoluble impurities including lime as carbonate, boiling the solution extract to precipitate zinc oxy-carbonate with removal from the solution of $CO_2$ and $NH_3$ and recovery thereof, separating the solutions and the impurities in solution including chlorides from the precipitate, redissolving the precipitated oxy-carbonate in ammoniacal ammonium carbonate solution with further separation of insoluble impurities and extraction thereof with ammoniacal ammonium carbonate, heating the solution to precipitate a purified zinc oxy-carbonate low in chlorine content with incomplete removal of $NH_3$ and $CO_2$ from the solution, separating the precipitate and returning the solution for use in a succeeding extraction step.

2. A cyclic process of obtaining from chloride-containing zinc waste such as galanizer's sal skimmings zinc compounds substantially chloride-free suitable for manufacturing zinc sulfide pigments which comprises extracting the zinc waste with ammoniated ammonium carbonate solution with addition of lime to convert chlorides of the waste to calcium chloride, separating insoluble impurities, boiling the extract to regain ammonia and to precipitate zinc compounds, separating chloride-containing liquor, redissolving the precipitate in ammoniated ammonium carbonate solution with further separation of insoluble matter and return thereof to the first extraction, heating this solution to reprecipitate zinc compounds and recycling residual liquor containing ammoniacal ammonium carbonate to the first ammonium carbonate extraction.

3. A process of converting chloride-containing zinc compounds into purified zinc oxy-carbonate substantially free of chlorine which comprises treating the compound with a solution of ammonium carbonate and ammonia and some lime so as to convert the chlorides to calcium chloride and to dissolve zinc compounds, discarding insoluble matter, boiling the solution, thereby precipitating zinc compounds incompletely freed of chloride, distilling off ammonia and leaving chlorides in solution, separating the precipitate, redissolving it in ammoniated ammonium carbonate solution with separation of insoluble matter and heating said solution, precipitating zinc oxycarbonates substantially chloride-free.

4. In processes of recovering zinc compounds from crude zinciferous material containing chlorides, wherein the zinc values are extracted in ammoniacal ammonium carbonate solution with separation of insoluble matter and precipitated as zinc-oxycarbonate by heating the extract, a cyclical process improvement giving a product substantially chloride-free and characterized by adding lime to the mass under extraction previous to separation of insoluble matter and employing recycled liquid, heating the extract to precipitate zinc-oxy-carbonate, discarding the liquid containing soluble impurities remaining, redissolving the oxy-carbonate precipitate in ammoniacal ammonium carbonate with separation of insoluble residue, precipitating pure zinc oxy-carbonate from said solution and returning the solution containing residual zinc for extraction of crude material.

5. In the process of claim 4, returning insoluble residue separated in and after the redissolving step for subsequent extraction together with crude material.

HENRY SEYMOUR COLTON.